Sept. 12, 1967     J. PUTTERLIK     3,341,094
CENTRIFUGE FOR CONTINUOUSLY EFFECTING CONCENTRATION
OF SOLIDS FROM A SUSPENSION THEREOF IN LIQUID
Filed April 12, 1965
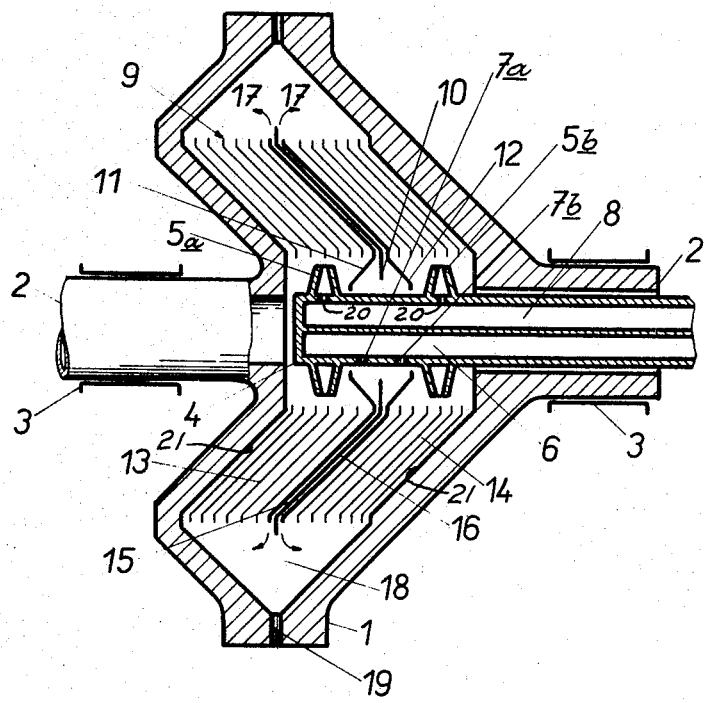
INVENTOR.
Jan Putterlik
BY Richard ...

3,341,094
CENTRIFUGE FOR CONTINUOUSLY EFFECTING CONCENTRATION OF SOLIDS FROM A SUSPENSION THEREOF IN LIQUID
Jan Putterlík, Prague, Czechoslovakia, assignor to Československá akademie věd, Prague, Czechoslovakia
Filed Apr. 12, 1965, Ser. No. 447,165
Claims priority, application Czechoslovakia, Apr. 14, 1964, 2,151/64
3 Claims. (Cl. 233—29)

This invention relates generally to a centrifuge for continuously effecting concentration of solids from a suspension or dispersion thereof in liquid.

Centrifuges which have been recently employed for obtaining a concentrated solids fraction from a fine-grained dispersion of the solids in a liquid, for example, a colloidal suspension, usually include a centrifugal drum or bowl rotated at a high speed about its axis which is, in most cases, disposed vertically. The most important components of the existing centrifuges include a separator consisting of frusto-conical separating disks arranged in an axially spaced series within the bowl or drum and being of smaller outer diameter than the bowl shell so that the latter defines a peripheral space extending around the outer peripheries of the separating disks for collecting the concentrated solids fraction. The suspension to be centrifuged is supplied to the rotated bowl through an axial inlet tube which opens into a distributor for bringing the suspension near to the outer peripheries of the separating disks. The peripheral solids collecting space of the bowl or drum is provided with discharge nozzles and with suitable valve or other devices for controlling the discharge of concentrated solids therethrough. Further, there is provided a discharge tube for the clarified liquid fraction which extends axially from the bowl and has openings in the region of the inner peripheries of the separating disks for receiving the clarified liquid fraction therefrom.

The existing centrifuges having the general arrangement described above cannot operate continuously so as to concentrate suspensions to the state of a solid sediment, that is, to obtain a concentrated solids fraction containing very small proportions of the liquid. The foregoing limitation results from the fact that, in the existing centrifuges, the process of separation of the solids from the liquid commences during the flow of the suspension through the distributor which defines a feed channel of relatively large cross-sectional area. Thus, the separation process commences before the suspension enters the actual separator constituted by the separating disks. By reason of the commencement of the separation process during flow of the suspension in the distributor, there occurs premature separation of the relatively coarse particles which are deposited centrifugally in the solids collecting space of the bowl immediately after leaving the distributor, whereas the relatively finer grained particles of the suspension are separated from the liquid fraction only during flow through the spaces between the separating disks which are axially spaced from the outer periphery or exit of the distributor. Thus, the solids deposited in the collecting space of the bowl have different grain sizes at various axial locations in the collecting space. The portions of the collected solids made up of the coarser-grained particles are relatively thick or viscous, that is, approaching the character of a solid, while the portions of the collected solids made up of relatively finer-grained particles are relatively liquid. The more liquid portions of the collected solids tend to pass initially through the discharge nozzles of the bowl or drum, while the coarser-grained portions of the collected solids, being less liquid, or even solid in consistency, pass through the discharge nozzles only after a substantial interval or delay. In order to prevent choking of the centrifugal bowl or drum by the portions of the collected solids made up of coarser-grained particles, it is necessary to discharge such particles, as well as the finer-grained particles, before the coarser-grained particles become so concentrated or thickened as to excessively delay the discharge thereof in relation to the discharge of the finer-grained particles. Thus, it is impossible to hold the collected solids within the peripheral space of the bowl until a high degree of concentration thereof has been achieved.

The premature separation of the relatively coarser-grained particles form a suspension in existing centrifuges further adversely affects the efficiency and capacity of the separator constituted by the separating disks. The foregoing disadvantage results from the fact that by reason of the separation from the suspension of the coarser-grained particles prior to the passage of the suspension between the separating disks, the separation of the finer-grained particles from the liquid fraction must be achieved within the disk separator without the possibility of adsorption of the finer-grained particles on the coarser-grained particles.

It is an object of this invention to provide a centrifuge for continuously effecting concentration of solids from a suspension thereof in liquid, which centrifuge avoids the above mentioned disadvantages of the existing centrifuges employed for the stated purpose.

In accordance with an aspect of this invention, a centrifuge for the continuous concentration of solids from a suspension thereof in a liquid comprises a hollow bowl rotated about a horizontal axis and containing an axially arranged series of frusto-conical separating disks nested successively into each other, that is, all oriented in the same direction, with an outer peripheral space in the bowl extending around the separating disks for collecting concentrated solids and having outlets opening from such space for discharge of the concentrated solids, generally frusto-conical dividing means interposed in the series of separating disks to divide such series into two substantially equal separating sections, such dividing means further defining separate distributing channels or gaps for the two separating sections, such gaps being relatively narrow and having segregated entries at the radially inner periphery of the dividing means and exits at the radially outer periphery of the dividing means near to the respective separating sections, and a tubular member extending axially into the bowl and defining an inlet passage for supplying the suspension to be centrifuged and an outlet passage for discharging a clarified liquid fraction from the bowl, such tubular member having separate openings from its inlet passage to the segregated entries of the distributing gaps and collecting means on the tubular member located so as to be disposed at opposite sides of the distributing means and opening into the outlet passage of the tubular member to separately collect the clarified liquid fraction from the two separating sections of the centrifuge.

In a preferred embodiment of the invention, the dividing means interposed in the series of separating disks to divide the latter into two separating sections includes a central frusto-conical dividing disk and two frusto-conical distributing disks arranged at the opposite side of the dividing disk and being spaced axially from the latter to define the two distributing gaps therebetween, and such distributing disks have radially inner portions that diverge inwardly away from the dividing disk so that the entries of the distributing gaps are generally funnel-like in cross-section and are segregated by the radially inner portion of the dividing disk therebetween.

The above, and other objects, features and advantages of the invention, will be apparent in the following detailed description of an illustrative embodiment thereof which is to be read in connection with the accompanying drawing forming a part hereof, and wherein the single view of the drawing is an axial sectional view of a centrifuge constructed in accordance with this invention.

Referring to the drawing in detail, it will be seen that the illustrated centrifuge embodying this invention comprises a bowl 1 arranged with its axis extending horizontally and having journals 2 projecting from its opposite ends and being rotatably supported in suitable bearings 3. A non-rotatable, hollow tubular member 4 extends axially into bowl 1 through one of the journals 2 and, within the bowl 1, is provided with hollow, circular collecting members or traps 5a and 5b which are axially spaced apart. The collecting members or traps 5a and 5b open, at their outer peripheries, into the space or cavity within bowl 1 and communicate through openings 20 in the wall of tubular member 4 with an outlet passage 8 extending along the latter and through which a clarified liquid fraction of the centrifuged suspension is to be discharged from bowl 1. The tubular member 4 also defines an inlet passage 6 extending therealong for supplying the suspension to be centrifuged to the bowl 1, and openings 7a and 7b are formed in tubular member 4 at axially spaced locations between the collecting members 5a and 5b and communicate with inlet passage 6.

The interior cavity of bowl 1 has an outer peripheral portion 18 for collecting a concentrated solids fraction of the suspension which is supplied through inlet passage 6, and discharge nozzles 19 open outwardly from the peripheral space 18 for discharging the concentrated solids fraction from bowl 1. Inwardly of the solids collecting space 18, the cavity of bowl 1 has generally frusto-conical, parallel end wall surfaces 21 and, between such end wall surfaces 21 there is disposed an axially arranged series of spaced apart frusto-conical separating plates 9 which are nested into each other, that is, all arranged parallel to each other and to the end wall surfaces 21.

In accordance with the present invention, the series of separating disks 9 is centrally divided into two separating sections 13 and 14 which are provided with separate distributing means for leading the suspension to be centrifuged from the openings 7a and 7b, respectively, of inlet passage 6 to the outer peripheries of the separating disks in the two separating sections 13 and 14.

In the illustrated embodiment of the invention, the division of the series of separating disks 9 into the two separating sections 13 and 14 is achieved by means of a generally frusto-conical dividing disk 10 and two generally frusto-conical distributing disks 11 and 12 disposed at the opposite sides of disk 10 and spaced a small axial distance from the latter so as to define narrow distributing gaps 15 and 16 therebetween. The three disks 10, 11 and 12 are interposed in the series of separating disks 9, approximately at the center of such series. Further, the inner peripheral portions of disks 10, 11 and 12 preferably extend radially inward beyond the inner peripheries of separating disks 9 so as to extend relatively closely around tubular member 4 between the collecting members 5a and 5b on the latter.

As shown, the inner peripheral portion of dividing disk 10 preferably extends in a radial plane located between the openings 7a and 7b from the inlet passage 6, while the inner peripheral portions of the distributing disks 11 and 12 preferably diverge from the inner peripheral portion of disk 10 in the radially inward direction so as to form funnel-like entries into the respective distributing gaps 15 and 16. Finally, as shown, the outer peripheral portion of the central dividing disk 10 may extend radially outward beyond the outer peripheries of the distributing disks 11 and 12 and thereby segregate the exits from the distributing gaps 15 and 16.

The above described centrifuge embodying this invention operates as follows:

The suspension to be centrifuged is supplied through inlet passage 6 and passes from the latter through openings 7a and 7b into the funnel-like entries of the distributing gaps 15 and 16, respectively. The suspension emerges from the exits of the distributing gaps 15 and 16 at the opposite sides of the outer periphery of dividing disk 10 and is uniformly distributed, as indicated by the arrows 17, to the outer peripheries of the disks 9 in the respective separating sections 13 and 14. Since the distributing gaps 15 and 16 are narrow, the flow of suspension therethrough occurs at a high rate of speed in the direction parallel to that of the centrifugal force so that premature separation of solids from the liquid constituent of the suspension will not occur during flow of the suspension through the distributing gaps 15 and 16. Thus, the distributing gaps 15 and 16 serve only to accelerate the suspension to the rotational speed of the bowl 1 and to lead symmetrical flows of the suspension to the outer peripheries of the separating disks 9 in the two sections 13 and 14. The continuously flowing suspension is subjected to the separating effect only while flowing substantially horizontally away from the exits of the distributing gaps 15 and 16, as indicated by the arrows 17, and during the radially inward or centripetal flow of the suspension between the separating disks 9 of the two separator sections 13 and 14.

During such centripetal flow of the suspension between the separating disks 9 of the two sections 13 and 14, the suspension is divided, in the usual way, into a clarified liquid fraction which is collected by the collecting members or traps 5a and 5b at the inner peripheries of the separating disks of the respective sections 13 and 14 for discharge through the outlet passage 8, and into a thickened or concentrated solids fraction which is centrifugally deposited in the outer peripheral collecting space 18.

Since premature separation of the relatively large-grained particles from the suspension is avoided during flow of the suspension through the distributing gaps 15 and 16, as indicated above, the distribution of the grain sizes of the solid particles collected in space 18 is practically uniform across the latter. The fact that the larger-grained particles are not prematurely separated makes it possible for the relatively finer-grained particles to be adsorbed by the larger-grained particles which enhances the separation effect and thereby improves the efficiency and capacity of the centrifuge.

The uniform distribution of grain sizes in the deposit of solids collected in the space 18 ensures that such deposit will discharge symmetrically and evenly through the discharge nozzles 19 and thereby make possible attainment of a concentrated solids fraction which is almost entirely constituted by solids, that is, contains only a very small proportion of the liquid constituent of the suspension.

The described arrangement of the separating disks and associated distributors for the suspension within the bowl and the rotation of the latter about a horizontal axis are further advantageous in that the force of gravity is thereby made to act alternately in directions toward and away from the axis of rotation at the frequency of the rotational speed of the bowl. Such relatively high frequency reversal of the direction of the force of gravity with respect to the axis of rotation produces a vibrational effect within the mass of suspension in the bowl. Such vibrational effect assists coagulation, that is, the creation of agglomerates of solid particles in the suspension, which agglomerates are therefore centrifuged at a faster rate. Further, the vibrational effect tends to break down rigid couplings between solid particles deposited in the collecting space 18 and thereby facilitates release of the liquid constituent from the deposited solids, which released liquid then flows centripetally out of the space 18 so as to permit a higher degree of concentration of the solids in space 18. The vibrational effect, while permitting a higher degree of concentration of the collected solids in space 18, also decreases the resistance to flow of the solid particles, even when the latter are in an extremely thickened condition, and thereby facilitates the discharge of the highly concentrated solids fraction through the discharge nozzles 18.

Since the separating disks 9 and the dividing disk 10 and distributing disks 11 and 12 are all oriented in the same direction, that is, have their frusto-conical shapes all nested into each other, a relatively large number of such disks can be accommodated within the internal cavity of the bowl 1 for increasing the separating capacity of the centrifuge without unduly increasing the size thereof.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What is claimed is:

1. A centrifuge for the continuous concentration of solids from a suspension thereof in a liquid, comprising a hollow bowl rotated about a horizontal axis, an axially arranged series of frusto-conical separating disks nested into each other in spaced relation within said bowl, said bowl having a space for collected concentrated solids extending around the outer peripheries of said disks and outlets for the concentrated solids opening from said space, a frusto-conical dividing disk arranged centrally in said series of separating disks to divide the latter into two separating sections, two frusto-conical distributing disks arranged at the opposite sides of said dividing disk and being spaced from the latter to define two distributing gaps therebetween opening radially outward into said space for the concentrated solids at the same sides of said dividing disk as the respective separating sections, a hollow tubular member extending axially into said bowl and having passages extending therealong for respectively supplying suspension and discharging clarified liquid, said dividing and distributing disks extending radially inward beyond said separating disks to the proximity of said tubular member to form entries for suspension at the radially inner peripheries of said distributing gaps, said tubular member having openings from said suspension supplying passage in the regions of said entries, and collecting members for clarified liquid extending from said tubular member in the regions of said separating sections and opening into said clarified liquid discharging passage, all of said disks within said bowl being identically oriented and said distributing gaps being narrow enough to prevent separation from taking place until said suspension reaches said space in said bowl around the outer peripheries of said separating disks.

2. A centrifuge as in claim 1; wherein said distributing disks have inner portions that diverge from said dividing disk in the radially inner direction so that said entries of the gaps are funnel-like.

3. A centrifuge for the continuous concentration of solids from a suspension thereof in a liquid, comprising a hollow bowl rotated about a horizontal axis, an axially arranged series of frusto-conical separating disks nested successively into each other in spaced relation within said bowl, said bowl having a space for collecting concentrated solids, which space extends around the outer peripheries of said disks and has outlets for the concentrated solids fraction opening from said space, generally frusto-conical dividing means interposed in said series of disks to divide the series of disks into two substantially equal separating sections, a tubular member extending axially into said bowl and defining an inlet passage for supplying suspension to be centrifuged and an outlet passage for discharging a clarified liquid fraction from the bowl, said dividing means defining separate distributing gaps for said two separating sections, which gaps are narrow enough to prevent separation of the suspension and have segregated entries at the radially inner periphery of said dividing means adjacent said tubular member and exists at the radially outer periphery of said dividing means near to the respective separating sections, said tubular member having separate openings from said inlet passage to said entries of the distributing gaps for separately supplying suspension to the latter, and collecting means on said tubular member at opposite sides of said dividing means and opening into said outlet passage to separately collect a clarified liquid fraction from the two separating sections for discharge from the bowl, all of said disks within said bowl and said dividing means being identically oriented.

References Cited

UNITED STATES PATENTS

| | | | |
|---|---|---|---|
| 1,008,896 | 11/1911 | Fisher | 233—35 X |
| 2,265,459 | 12/1941 | Strezynski | 233—29 |
| 2,313,540 | 3/1943 | Hall | 233—29 XR |
| 2,500,100 | 8/1958 | Strezynski | 233—28 |
| 2,847,158 | 8/1958 | Thylefors | 233—29 |
| 3,081,028 | 3/1963 | Steinacker | 233—29 XR |
| 3,117,928 | 1/1964 | Thylefors | 233—29 XR |

M. CARY NELSON, *Primary Examiner.*

H. T. KLINKSIEK, *Examiner.*